United States Patent Office 3,107,403
Patented Oct. 22, 1963

3,107,403
RAPID CURING RESIN-FILLER SYSTEMS
William G. Moore, Midland, Mich., assignor to The Dow Chemical Company, Midland, Mich., a corporation of Delaware
No Drawing. Filed Dec. 21, 1959, Ser. No. 860,651
4 Claims. (Cl. 22—194)

This invention relates to binder-filler systems, more particularly to molding cores prepared from reactive polymerizable epoxide binders, and to a process for the preparation of such cores.

The production of cores for metal casting normally involves the addition to core sand of small amounts of a resinous binder, e.g. urea-formaldehyde. This addition permits the sand to be shaped to a desired form, or core, after which, heat or other treatments are used to convert the formed, uncured ("green"), sand-binder mixture into a hard, solid, cured state. Generally, use of such conventional binders requires prolonged heating of the "green" cores in a holding mold to produce a hard, cured core. This process thus requires in addition to the lengthy treatment time, a large investment in the number of holding molds needed to hold the cores dimensionally stable during the lengthy cure. Now, unexpectedly, this invention describes a system whereby upon mixing a polymerizable epoxide binder and sand, "green" cores can be prepared and shaped. These cores can be almost instantaneously converted at room temperatures to a final, cured core by treatment with a gaseous, ionic, polymerization catalyst.

It is the principal object of the present invention to provide a system and process for the rapid preparation of molding cores. An object of this invention is to provide an extremely rapid conversion of "green" cores to a cured state by a simple room temperature treatment. Another object is to provide a means of converting the resin-producing binder into its polymeric form in the original shaping mold thereby eliminating both the need for use of subsequent holding molds or forms and for mechanical handling of the molded cores in the weak, "green" state as is now conventionally done. A further object is to provide cores that are easily shaped by using the epoxide binder. Additionally, it is an object to provide cured cores which exhibit good collapsibility in the metal casting process. Still other objects and advantages will be apparent from the following detailed description of the invention presented hereinafter.

This invention comprises; (1) preparing a mixture containing a particulate inorganic or organic filler and from about 1 to about 15 percent, preferably from about 1.5 to about 4 percent on the filler weight, of a polymerizable epoxide binder capable of undergoing polymerization in the presence of a gaseous, ionic, polymerization catalyst; (2) placing the composition in a mold; (3) tamping the composition in the mold in a conventional manner to prepare a "green" core; and, (4) treating the "green" core for a short period of time at room temperature with a gaseous, electrophilic, ionic polymerization catalyst thereby to provide a cured core.

The filler phase of the core mixture can be any of the conventionally used inert, particulated or fibrous organic or inorganic filler materials, e.g. sand, powdered quartz, clays, mica, glass, asbestos, wood flour, wheat flour, polyacrylonitrile, expanded and partially expanded foamed-in-place polystyrene beads, cotton, nylon and the like. Of these materials, sand ordinarily is used in the preparation of cores. In the instant compositions, satisfactory cores result using "bank" sand normally used by foundries for core production which has not been washed or cleaned and therefore still contains a small amount of clay, moisture and organic materials. However, if washed and dried sand is used from which these latter contaminants have been removed, cores with somewhat higher tensile strength and hardness result.

Epoxides useful in preparing cores of the present invention are limited to those materials which polymerize readily in the presence of an ionic catalyst, and which, when admixed with a filler, upon polymerization produce cured cores of acceptable tensile strengths. Suitable polyepoxides are, for example, polyallylglycidyl ether, diglycidyl ether of bisphenol A, epoxidized soybean oil, dicyclopentadiene dioxide, limonine dioxide and the like. Alternatively, a portion of the polyepoxide can be replaced by a monoepoxide, e.g. phenylglycidyl ether, epoxidized castor oil and the like.

Advantageously, a less expensive polyol or acid anhydride, e.g. glycerol, diethylene glycol, pentaerythritol, sugar derived polyols, castor oil, polypropylene glycols, polyhydroxy aromatics, mixtures of polyfunctional hydroxy organics, phthalic anhydride, succinic anhydride, maleic anhydride and the like can be substituted for a portion of the epoxides and the mixtures used as a binder to produce cores having the same property characteristics as the epoxide binders alone.

Selection of a specific epoxide or mixture of epoxides and additaments of polyols and acid anhydrides as a binder will be dependent upon the specific use of the cores ultimately desired. For example, in metal molding, the tensile strength of the core must be at least 100 pounds per square inch. Compositions of binder components useful for this application are limited to the polyepoxides and to various polyepoxide based mixtures containing one or more of the above listed substituents, which compositions upon blending and subsequent polymerization of the various components yield a resin having a viscosity of about $1 \times 10^6$ stokes or higher as measured at about 25° C. In other instances, where tensile strengths of the cores can be less than 100 pounds per square inch, the substituents in the polyepoxide containing mixtures may be increased to give resins having a viscosity as low as about 500,000 stokes with consequent loss in tensile strength. With polymerizable compositions of these constituents wherein the resins have a viscosity much less than 500,000 stokes, when such compositions are used as a binder for sand in production of cores, the cured cores are non-rigid, somewhat rubbery and exhibit plastic flow when subjected to stress.

Inclusion of a small amount, up to about two percent on the total weight of the core compositions, of a tough, high molecular weight resin, e.g. polyvinyl chloride, polystyrene latex particles or polystyrene-divinyl benzene mixtures into an epoxide-sand core composition also is found to improve somewhat the properties of the core.

The binder and sand core are blended together by means of a conventional mixer or muller apparatus.

Catalysts used to carry out the polymerization of the epoxides and thereby cure the core are gaseous, electrophilic, strong Lewis acids, e.g., boron trifluoride, titanium tetrachloride vapor, tin tetrachloride vapor, and the like.

Boron trifluoride is an especially effective catalyst for it is a gas at normal temperatures and readily can be forced through porous media of the present compositions which result from mixing small amounts of the epoxides with granular and fibrous particles. The actual quantity of boron trifluoride catalyst needed for curing the cores is not critical and is a quite small amount. For example, a 3 second treatment with boron trifluoride at a flow rate of about 0.17 cubic foot per minute of a standard tensile strength core which contained about 98 grams sand and about 2 grams of a mixture comprised of 75 parts diglycidyl ether of bis-phenol A and 25 parts diethylene glycol gave a hard, cured core. In a second test, the boron trifluoride was diluted with an inert gas e.g., air, to a ratio of about 26:1. A standard tensile strength test core was treated with this gas mixture for about 3 seconds as above. This gas mixture was found to be just as effective a catalyst as the boron trifluoride alone in preparing the rapidly cured core. With diluted mixtures of the catalyst, more total gas can be forced through the core mixture thereby helping to eliminate non-catalyzed or "dead spots" in a core. The problem of dead spots is prevalent in large, complex forms which may contain a number of such areas that are not easily penetrated by the catalytic vapors at low velocities and low pressures.

Ordinarily in this process the boron trifluoride catalyst is passed under pressure through the core mold, but alternatively the catalyst can be either rapidly sucked into a partially evacuated mold or sorbed onto a porous material which could be incorporated into the core composition, and the gas then be liberated by heating or other convenient means. Any excess of the toxic boron trifluoride catalyst which remains in or on the cured core after treatment conveniently can be removed from the core by purging with an inert gas, by employing a brief vacuum treatment, or by treating the core with ammonia gas.

With compositions of the present invention and by using the present process of core preparation, cores are produced which have acceptable tensile strengths and hardness ratings as measured using the Standard A.F.S. Core Tensile Test and Core Hardness Test described by Dietert, Foundry Core Practice, pp. 377–380, 385–386 American Foundrymen's Society, Chicago 1950.

Cores produced by the system of present process have acceptable physical property values as produced. However, at controlled, low humidities the tensile strength of the cores continues to rise with increasing time for up to about 48 hours. Under conditions of high humidity, about 70 percent relative humidity, the strength of the cores is found to decrease with time. In actual practice therefore, a determination of the maximum time before use would be determined by the combined effects of these two opposing factors. Introduction of a small amount, up to about 3 percent on weight of the binder, of a silicone resin into the core composition prior to polymerization aids in offsetting the effect of core deterioration during storage at high humidities and thereby lengthens the effective core life.

The present invention is illustrated further by the following examples, but is not construed to be limited thereto.

EXAMPLE 1

A series of tests was run evaluating the effects of storage time and humidity upon the strength of cores prepared from a composition comprising either about 2 or about 3 percent of various binder compositions containing the diglycidyl ether of bisphenol A as major constituent and about 97 to about 98 percent of washed sand both with and without addition of a silicone resin.

In carrying out these tests, standard tensile strength test cores were prepared by tamping a sand-binder mixture into a standard tensile strength core test mold. Each core was cured by forcing boron trifluoride gas at a low flow rate through the mixture in the mold for a period of time ranging from about 2 to about 10 seconds. The cores then were stored for various periods of time at room temperature in desiccators maintained at various humidities. The cores were removed from the desiccators and their tensile strengths and relative hardness ratings measured using the Standard A.F.S. Core Tensile Test and Core Hardness Test procedures.

Table I which follows, lists the various binder compositions tested, gives the experimental test data, and compares the tensile strength and hardness ratings obtained for these cores after various storage periods.

*Table I*

| Test No. | Binder | | | Cure Time [2] | Cure Atmosphere, Humidity, Percent | Cured Core | |
|---|---|---|---|---|---|---|---|
| | Composition | Weight on sand, Percent | Boron Trifluoride Treatment [1] (Sec.) | | | Tensile Strength, Pounds per Square Inch | Hardness Rating |
| 1 | DER [3] | 3 | 10 | 15 min | 0 | 227 | 95 |
| 2 | DER [3] | 3 | 10 | 1 hr | 0 | 255 | 94 |
| 3 | DER [3] | 2 | 10 | 15 min | 0 | 167 | 92 |
| 4 | DER [3] | | 10 | 30 min | 0 | 162 | 93 |
| 5 | DER [3] | | 10 | 90 min | 0 | 177 | 92 |
| 6 | DER [3] | | 10 | 24 hrs | 0 | 196 | 92 |
| 7 | 75DER-25DEG [3] | 3 | 5 | 15 min | 0 | 273 | 93 |
| 8 | 75DER-25DEG plus | 3 | 10 | 3 hrs | 0 | 277 | 94 |
| 9 | 3 percent Silicone Resin [4] on Wt. of Binder. | | | | 31 | 183 | 91 |
| 10 | | | | | 71 | 117 | 86 |
| 11 | | | | | 100 | 97 | 85 |
| 12 | 80DER-10DEG-10PETA [3] | 3 | 5 | 3 hrs | 0 | 125 | 90 |
| 13 | | | | | 31 | 105 | 90 |
| 14 | | | | | 71 | 67 | 88 |
| 15 | | | | | 100 | 57 | 90 |
| 16 | 75DER-25DEG | 3 | [5] 2 | 15 min | 0 | 220 | 93 |

[1] Boron trifluoride flow rate of about 0.39 cu. ft. per min. unless designated differently.
[2] Tensile test coires cured at room temperature.
[3] DER—diglycidyl ether of bisphenol A, DEG—diethylene glycol, PETA—pentaerythritol.
[4] Commercial resin of the type such as Dow Corning Corp. product 129-G.
[5] Boron trifluoride flow rate of about 0.08 cu. ft. per min. and diluted three times with air.

EXAMPLE 2

Cores used in molding part of a valve assembly are prepared by tamping compositions of sand-3 percent diglycidyl ether of bisphenol A or sand-3 percent of a mixture of 75 parts diglycidyl ether of bisphenol A and 25 parts diethylene glycol into a corresponding corebox in a conventional manner followed by forcing boron trifluoride through the "green" core for about 5 seconds. Gas penetration is quite uniform and good curing of the core results. The so-cured cores can be stored for up to about 72 hours or more under normal atmospheric conditions prior to use in a normal iron casting operation. No abnormal behavior of the cores is observed during casting, and the cores collapse in a satisfactory manner. Separation of the disintegrated core from the cooled casting is easily accomplished simply by shaking the casting.

In a manner similar to that described for the foregoing examples, rigid cores can result by treating in a core mold a tamped mixture of about 10 percent of diglycidyl ether of bisphenol A and about 90 percent sand with tin tetrachloride vapor, a mixture of about 4 percent of epoxidized soybean oil and about 96 percent of powdered quartz with gaseous boron trifluoride, a mixture of about 3 percent polyallyl glycidyl ether and about 97 percent glass fibers with titanium tetrachloride vapor, a mixture of about 8 percent aggregate total of 70 parts diglycidyl ether of bisphenol A, 15 parts phthalic anhydride and 10 parts diethylene glycol and about 92 percent clay with gaseous boron trifluoride, a mixture of about 6 percent of dicyclopentadiene dioxide and glycerol blend which upon polymerization gives a resin having a viscosity of about 1,000,000 stokes at about 25° C. and about 94 percent nylon fibers with tin tetrachloride vapor, a mixture of about 7 percent of diglycidyl ether of bisphenol A, castor oil and succinic anhydride blend which upon polymerization gives a resin having a viscosity of about 1,000,000 stokes at 25° C. and about 93 percent mica with titanium tetrachloride vapor, a mixture of about 5 percent epoxidized soybean oil and phenylglycidyl ether blend which upon polymerization gives a resin having a viscosity of about 1,000,000 stokes at about 25° C. and about 95 percent cotton fiber with tin tetrachloride vapor, a mixture of about 3 percent aggregate total of 90 parts diglycidyl ether of bisphenol A and about 10 parts of a polypropylene glycol having a molecular weight of about 400 and about 97 percent polyacrylonitrile with gaseous boron trifluoride, a mixture of about 9 percent polyallyl glycidyl ether, epoxidized castor oil and maleic anhydride blend which upon polymerization gives a resin having a viscosity of about 1,000,000 stokes at about 25° C. and about 91 percent wood flour with tin tetrachloride vapor, a mixture of about 2 percent of an aggregate total of 90 parts diglycidyl ether of bisphenol A and 10 parts castor oil and about 98 percent sand wtih titanium tetrachloride vapor, a mixture of about 6 percent diglycidyl ether of bisphenol A and glucose blend which upon polymerization gives a resin having a viscosity of about 1,000,000 stokes at about 25° C. and about 94 percent asbestos with gaseous boron trifluoride, a mixture of about 4 percent diglycidyl ether of bisphenol A and 1,3,5 trihydroxybenzene blend which upon polymerization gives a resin having a viscosity of about 1,000,000 stokes at about 25° C. and about 95 percent wheat flour with gaseous boron trifluoride, a mixture of about 15 percent diglycidyl ether of bisphenol A and about 85 percent partially expanded foamed in place polystyrene beads with gaseous boron trifluoride, a mixture of about 5 percent limonine dioxide and about 95 percent sand with gaseous tin tetrachloride vapor and a mixture of about 3 percent diglycidyl ether of bisphenol A, about 2 percent of polyvinyl chloride and about 95 percent of sand with gaseous boron trifluoride.

Any of the suggested binder systems can be blended with any of the suggested fillers and these resulting compositions treated with any of the suggested gaseous ionic polymerization catalysts according to the process of this invention to yield rapidly cured, hard filler-binder compositions.

Various modifications may be made in the present invention without departing from the spirit or scope thereof for it is understood that I limit myself only as defined in the appended claims.

I claim:
1. A process for the preparation of a rapidly cured molding core which comprises:
 (a) providing a mixture consisting essentially of from about 1.5 to about 4 percent of diglycidyl ether of bisphenol A and from about 96 to 98.5 percent sand,
 (b) placing said mixture in a shaping mold and tamping said mixture in said mold thereby to prepare an uncured shaped core, and
 (c) passing under pressure through said core mold a catalytic quantity of an electrophylic, gaseous, strong Lewis acid catalyst thereby to polymerize said ether as said catalyst contacts said ether and simultaneously produce a cured core.

2. A process as defined in claim 1 wherein the catalyst is boron trifluoride.

3. A process as defined in claim 1 wherein up to about 25 percent of the diglycidyl ether of bisphenol A is replaced by diethylene glycol.

4. A process as defined in claim 1 wherein a silicone resin is added to the mixture of diglycidyl ether of bisphenol A and sand prior to blending said ether with said sand, said silicone resin being about 3 percent on the weight of said ether.

References Cited in the file of this patent
UNITED STATES PATENTS

| | | |
|---|---|---|
| 2,735,829 | Wiles et al. | Feb. 21, 1956 |
| 2,846,742 | Wagner | Aug. 12, 1958 |
| 2,894,920 | Ramos | July 14, 1959 |
| 2,943,953 | Daniel | July 5, 1960 |
| 3,008,205 | Blaies | Nov. 14, 1961 |